United States Patent

Martin et al.

Patent Number: 5,445,400
Date of Patent: Aug. 29, 1995

[54] CYCLE FRAME

[76] Inventors: Pierre A. Martin, Quartier les Roches, 26270 Loriol; Christian Pascaud, 8, rue Jules Ferry, 07250 Le Pouzin; Jean-Marie Riffard, 7, les Charmilles, 26250 Livron, all of France

[21] Appl. No.: 212,847

[22] Filed: Mar. 15, 1994

[30] Foreign Application Priority Data

Mar. 16, 1993 [FR] France ............... 93 03235

[51] Int. Cl.$^6$ .................. B62K 19/16; B62K 19/30
[52] U.S. Cl. ................... 280/281.1; 280/288.3
[58] Field of Search ............ 280/274, 275, 281.1, 280/283, 288.3

[56] References Cited

U.S. PATENT DOCUMENTS

| 626,706 | 6/1899 | Lippens | 280/275 |
| 680,048 | 8/1901 | Koch | 280/275 |
| 2,330,560 | 9/1943 | Descos | 280/274 |
| 2,446,731 | 8/1948 | Wheler | 280/275 X |
| 4,015,854 | 4/1977 | Ramond | 280/274 X |
| 4,856,800 | 8/1989 | Hashimoto et al. | 280/281.1 |

FOREIGN PATENT DOCUMENTS

| 0373858 | 6/1990 | European Pat. Off. . | |
| 0432064 | 6/1991 | European Pat. Off. . | |
| 809768 | 5/1951 | Germany . | |
| 124011 | 2/1949 | Sweden | 280/281.1 |
| 425503 | 3/1935 | United Kingdom | 280/281.1 |
| 2248807 | 4/1992 | United Kingdom . | |

Primary Examiner—Mitchell J. Hill
Assistant Examiner—Kevin Hurley
Attorney, Agent, or Firm—Bacon & Thomas

[57] ABSTRACT

A cycle frame includes a top member having a front terminal portion and a rear assembly portion, a bottom member defining a rear fork and a sloping member that is upwardly inclined from the rear fork to a front terminal portion thereof, a tubular member constituting a front steering swivel socket, a pair of lugs for interconnecting the front terminal portions of the top and bottom members to the tubular member, a pair of stays interconnecting the rear assembly portion and the rear fork, and a spacer member extending between the rear assembly portion and the bottom member. The front terminal portions of the top and bottom members have constant, polygonal-shaped cross-sections. The length of the cycle frame can be readily set to a desired dimension by cutting the front terminal portions of the top and bottom member and the height of the cycle frame can be readily adjusted by cutting the tubular member, the pair of stays and the spacer member.

14 Claims, 7 Drawing Sheets

CYCLE FRAME

The present invention relates to cycle frames, and more particularly frames for a bicycle or velocipede as opposed to a motorbike or other similar motor-driven vehicle.

BACKGROUND OF THE INVENTION

In the field of the invention, it may be considered that cycle frames can be subdivided into two families, depending on the embodiments concerned.

The first family concerns frames made up by assembling separate elements together, and the second family concerns frames made as single pieces, generally by molding.

The construction of a cycle frame must take into consideration three structural constants that may be considered as unavoidable. They are the length of the rear fork which depends on the radius of the wheel, the angle between the rear fork and a line interconnecting the crank socket and the saddle tube, and the angle of the front fork relative to a horizontal plane.

Although the above three structural characteristics are constant, it will be understood that the height of the frame, i.e. the distance between the crank socket and the top member of the frame, and also the length or projection of the frame, i.e. the distance between the saddle tube and the steering swivel, are values that are essentially variable if the size of the frame is to be adapted as well as possible to the morphological characteristics of the cyclist. Indeed, such adjustment is a prerequisite for cycling to be performed under good conditions and for optimum physical performance to be achieved.

With the first family of frames, satisfying the above structural conditions, both the constant conditions and the variable conditions, is not a real problem. It suffices to have frame elements available that are cut to the desired length in order to be able to assemble a frame that satisfies looked-for characteristics.

On most occasions, such a first family frame makes use of elements that are based on metal tubes or on tubes of so-called synthetic or plastics material such as those made of glass fiber or of carbon fiber.

However, in the second family which corresponds to a frame obtained by molding, satisfying both the constant and the variable structural conditions leads inevitably to a requirement for as many molds as there are to be different frames, if satisfaction is to be given to all requests.

It will readily be understood that it is difficult to make such a requirement compatible with acceptable costs. That is why molded frames are generally made on a one-off basis and are restricted to top level sporting applications.

Such a limit on implementation is not compatible with novel techniques of manufacture that make it possible to implement, by molding, a frame of composite material that is light in weight and particularly strong, being capable of providing performance levels that are much greater than those which can be achieved by the same cyclist using a conventional frame.

Frames made of composite material are essentially based on materials having a wall of draped and polymerized synthetic cloth surrounding a core made of synthetic resin foam, and more particularly a foam that is referred to as "structural" because of its density and of its mechanical characteristics. As an example of a "synthetic resin" mention may be made of polyurethane.

OBJECT AND SUMMARY OF THE INVENTION

The object of the invention is to provide a novel cycle frame and a novel way of implementing it enabling the main advantages of frames that are molded out of composite material to be retained while nevertheless retaining the facilities offered by frames in the first family whereby a frame can be personalized as a function of the morphological characteristics of the cyclist.

In other words, the object of the invention is to provide structural means enabling individual frames to be constructed as in the method based on separate elements, while still making the essential elements of the structure by a method based on molded composite material.

To achieve the above objective, the cycle frame comprises:

a top bar forming the top member and including a rectilinear front terminal portion of constant section and a rear assembly portion constituting a socket for receiving the saddle tube;

a one-piece bottom bar forming:

a rear fork provided with terminal portions defining bearing slots for receiving the axle of a rear wheel, and a sloping member constituting a bottom member that extends up from the fork and that includes a front terminal portion that is rectilinear and of constant section;

two stays connecting the saddle tube socket to the terminal portions of the rear fork;

a crank socket fitted in the bottom bar; and a spacer member mounted between the saddle tube socket and the crank socket.

BRIEF DESCRIPTION OF THE DRAWINGS

Various other characteristics appear from the following description made with reference to the accompanying drawings, which show embodiments of the invention as non-limiting examples.

FIG. 2 is an exploded perspective view of the component elements of a first embodiment of the frame in.

MORE DETAILED DESCRIPTION

Figure 1:
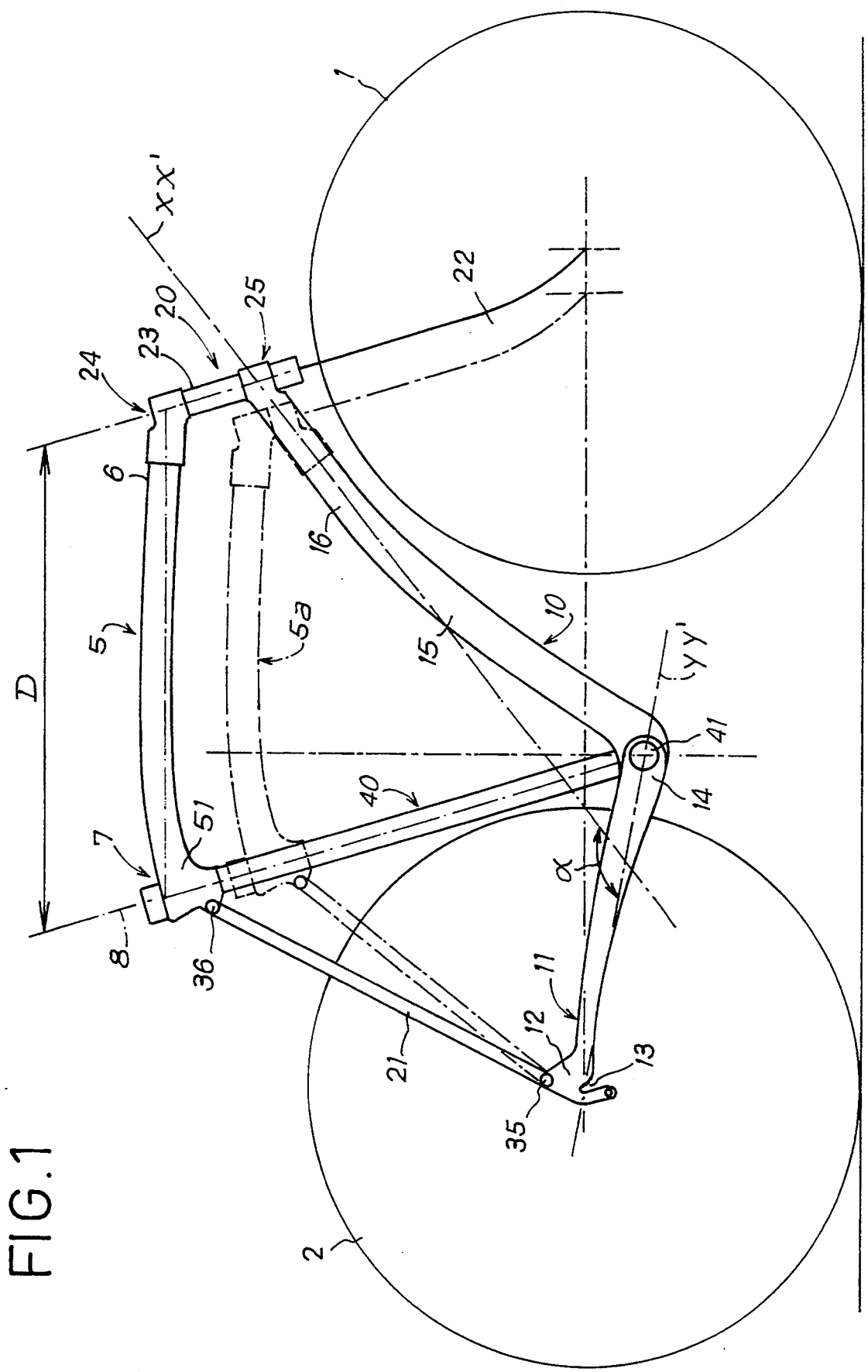
FIG. 1 is a diagrammatic view of a cycle frame of the invention.
Figure 2:
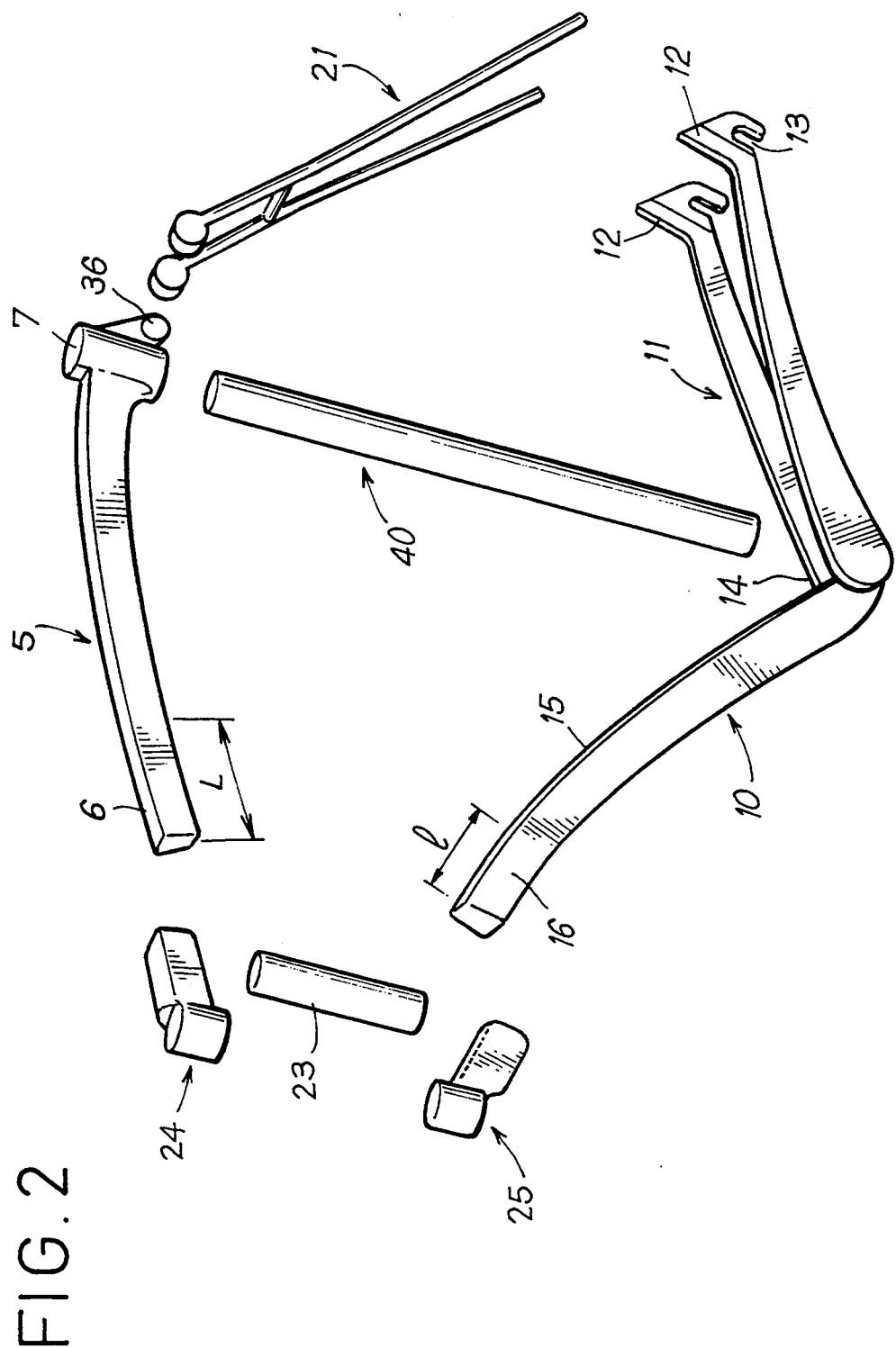
Figure 3:
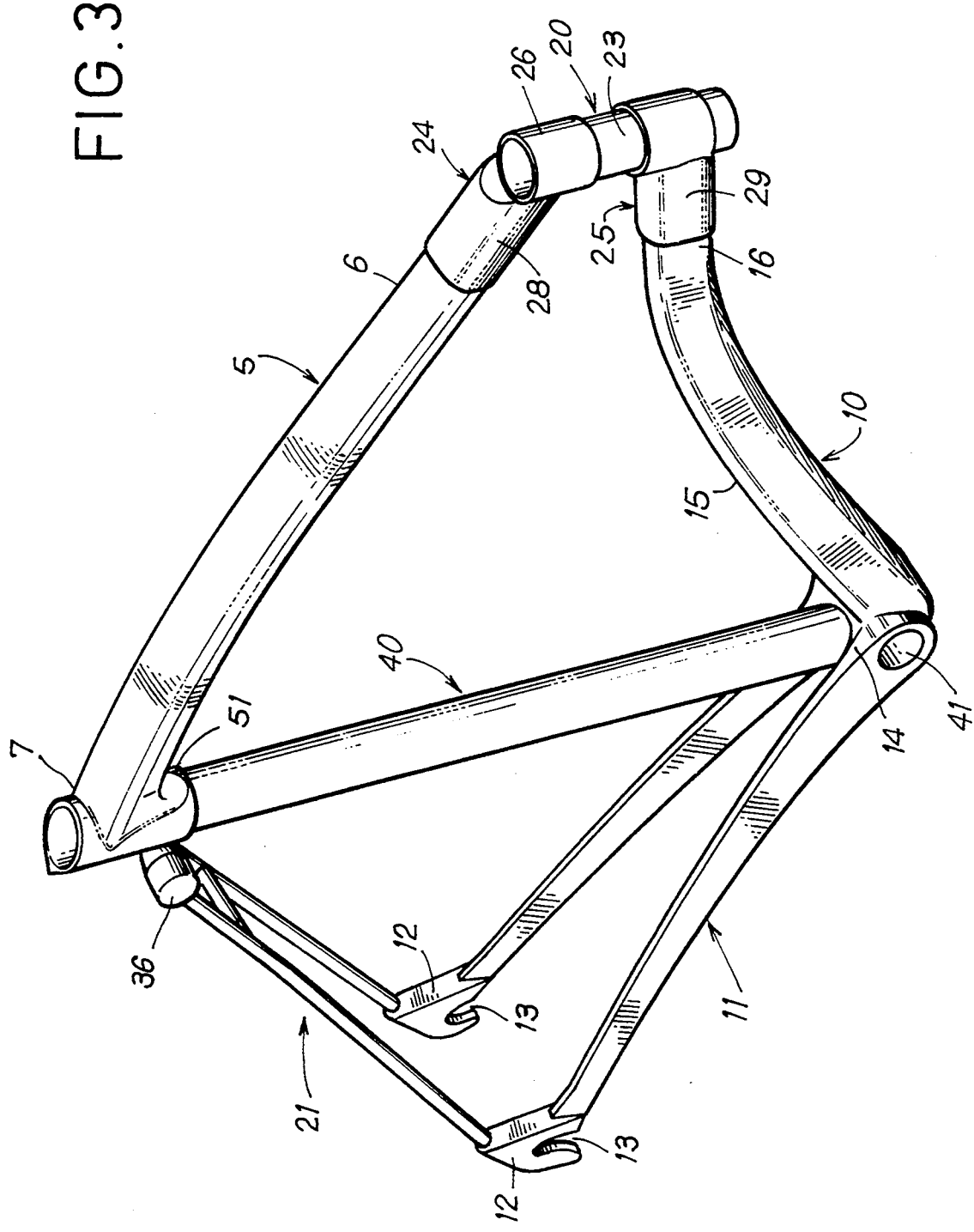
FIG. 3 is a perspective view showing how the component elements of FIG. 2 are assembled together.

FIGS. 1 to 3 show a first embodiment of the cycle frame of the invention, such a frame being made up by assembling together separate elements to form a strong assembly that extends in a plane and that is suitable firstly for receiving a front wheel 1 and a rear wheel 2, and secondly for supporting a cyclist capable, by means of a conventional pedal system, of driving the rear wheel 2 via an appropriate transmission (not shown).

The frame of the invention comprises a top bar 5 which is made by molding a composite material. In conventional manner, and by way of example, the term "composite material" covers a peripheral skin of preimpregnated and polymerized draped cloth surrounding a core of "structural" cellular material that is also synthetic, e.g. a polyurethane resin.

A bar 5 of the above type may be made by molding using conventional techniques that are not properly-speaking part of the invention.

The top bar 5 is constructed and made so as to include a front terminal portion 6 of length L having a right cross-section of constant dimensional characteristics, and of regular linear or rectilinear extent. The top bar 5 is also made to include a rear assembly terminal portion 7 for receiving a saddle tube 8 via means that are described below.

In the embodiment of FIG. 1, the top bar 5 is the sole top member of the frame which further comprises, in accordance with the invention, a bottom bar 10 which is made using the same method as the top bar 5, i.e. by molding a composite material. The one-piece bottom bar also includes a rear fork 11 provided with terminal portions 12 defining bearing slots 13 in which the axle of the back wheel 2 is mounted. The bottom bar 10 also includes a sloping member 15 running from the crown 14 of the rear fork 11 and extending upwards away from the fork. The member 15 includes a terminal portion 16 having the same characteristics as the terminal portion 6, i.e. it has a length l along which said terminal portion 16 is of constant right cross-section and in which it extends in a linear or rectilinear manner as indicated by line X—X' in FIG. 1. The line X—X' is at a constant angle α to the notional line Y—Y' passing through the crown 14 of the fork and the bearing slots 13.

The above-described frame elements 5 and 10 are assembled together by means of a steering swivel socket 20 and by means of rear stays 21.

The socket 20 which is suitable for receiving a front fork 22 for the front wheel 1 comprises one or more tube segments 23 that are secured, in particular by means of adhesive, to two assembly lugs 24 and 25 that are preferably, but not exclusively, made of metal. To this end, each of the lugs 24 and 25 includes a ring 26 and 27 suitable for threading onto a segment of tube 23 in order to be bonded thereon, preferably by adhesive. The tube 23 may be constituted by a part made of metal or by a segment of tube made of composite material.

Projecting from the corresponding ring 26 or 27, each lug 24 and 25 is provided with a sleeve 28 or 29 for engaging on and securing to, in particular by means of adhesive, respectively the front end portion 6 of the top bar 5 and the front end portion 16 of the member 15 of the bottom bar 10.

The sleeves 28 and 29 may be given inside shapes that are polygonal and complementary to the outside shapes of the end portions 6 and 16.

Figure 4:
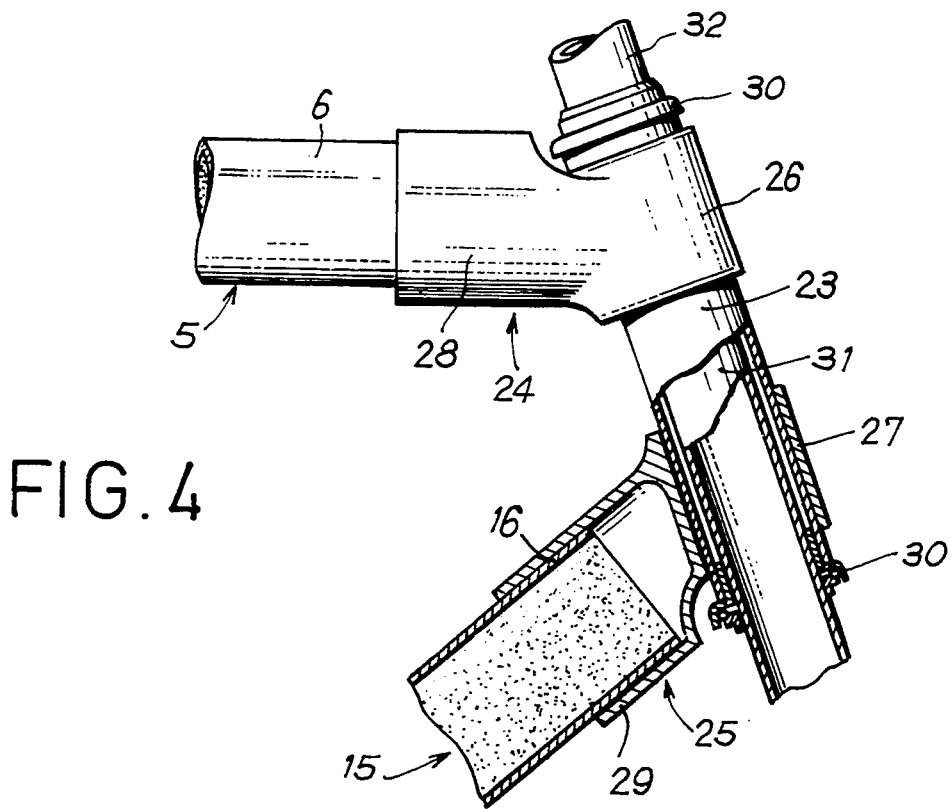
FIGS. 4 and 5 are elevations, partially in section, showing fragments of the means for assembling certain frame elements together.

As can be seen in FIG. 4, the tubular segment 23 is associated with ball bearings, caps, or cups 30 for centering and axially securing a column 31 of the front fork 22, using any means known in the art. The column 31 is also made suitable by any known means for engaging the stem 32 of handlebars of any appropriate type.

Figure 5:
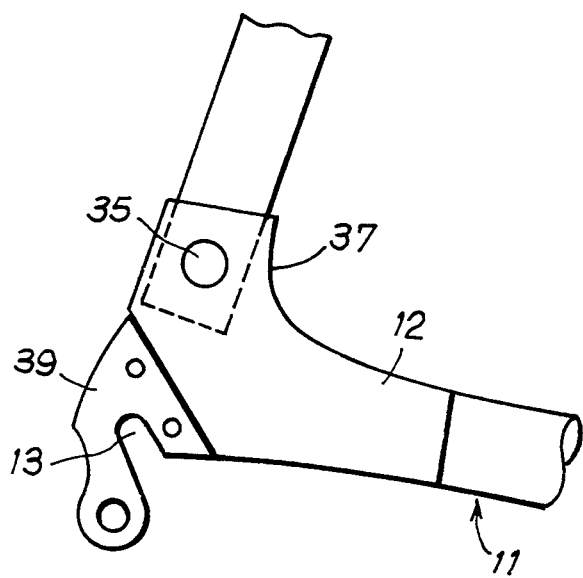

As mentioned above, the bars 5 and 10 are additionally connected together by the stays 21 which, in the embodiment shown in FIG. 5, are constituted by independent elements that are assembled by releasable means 35 and 36 to respective terminal portions 12 of the fork 11 and to the rear assembly portion 7 of the top bar 5. These assembly means 35 and 36 may be of any appropriate kind, and in particular they may be constituted by pins, pegs, cotters or dowels passing through complementary housings in the portions 12 and 7, which, to this end, may constitute means such as the tabs 37 in FIG. 5 and a projection 38 in FIG. 10 that may be added on or that may be integrally formed.

The tabs 37 may also be fitted by engagement, particularly when the rear portions 12 are constituted, at least in part, by plates 39 fitted to the bottom bar and shaped to define the bearing slots 13.

Figure 6:
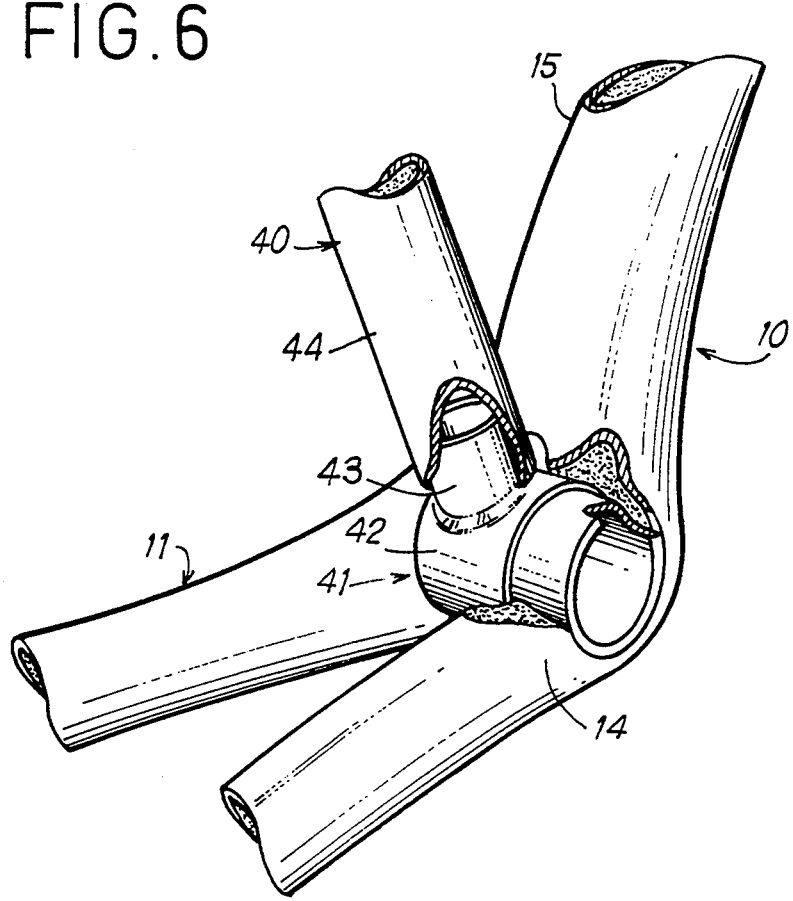
FIG. 6 is a partially cutaway fragmentary perspective view showing another way of assembling the frame elements together.

In addition, the top and bottom bars are also interconnected by a spacer member 40 for interconnecting the rear end portion 7 to the crown of the fork 14, and which includes, as shown in FIG. 6, a socket 41 for receiving the crank shaft and fitted in the crown 14 of the fork. The crank socket 41 comprises a bush 42 suitable for receiving, via ball bearings of the like, a pedal crank shaft fitted with one or more chain wheels and provided with pedals mounted in opposition. The bush 42 may, for example, be provided with a tubular sleeve 43 which extends along a direction that substantially bisects the angle between the fork 11 and the direction in which the member 15 extends, and in any event generally satisfying the constant value of the angle between said direction and the direction of the rear fork. The sleeve 43 may be smooth, or is preferably threaded to enable it to be assembled, optionally with additional adhesive, to the corresponding portion of a column 44 of any suitable material and intended to form the spacer member 40. Generally, the column 44 is of the metal tube type, but in certain applications a tubular structure of composite or synthetic material could also be considered.

Figure 7:
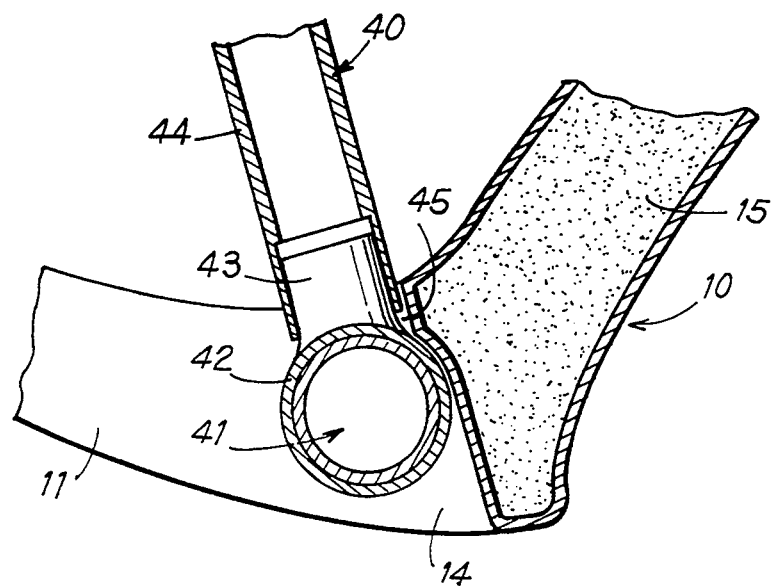
FIGS. 7, 8, and 9 are fragmentary elevation-section views showing variants of the FIG. 6 example.
Figure 8:
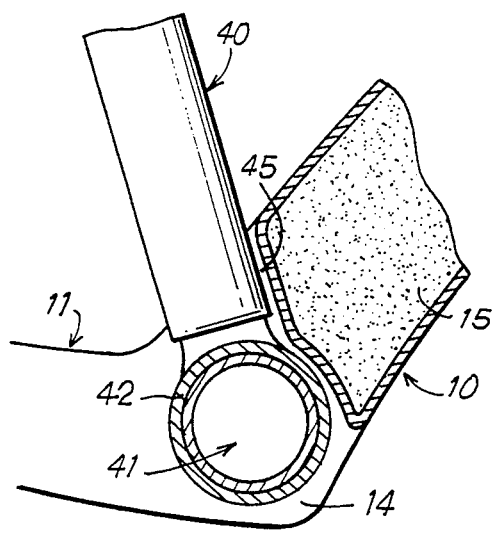
Figure 9:
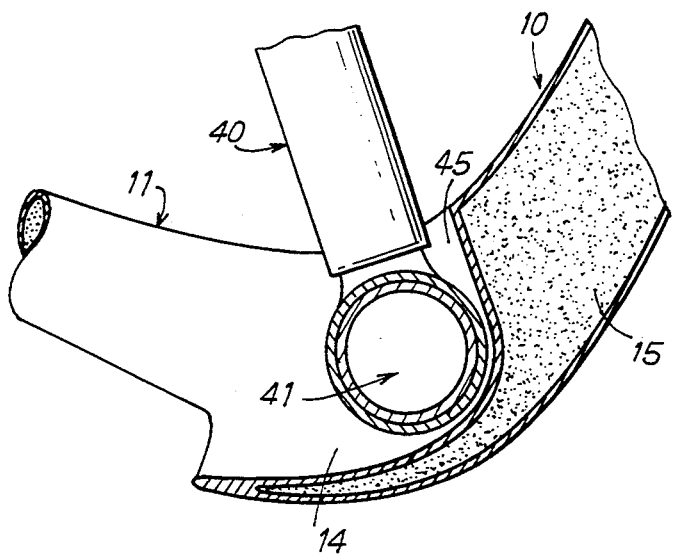

FIGS. 7, 8, and 9 show different ways in which the crank socket 41 can be fitted in the crown 14 of the fork, and also how the corresponding bottom end portion of the column 44 is connected and assembled thereto, with the option of FIG. 7 appearing to constitute the method of proceeding that is best, at least for ease of construction.

In all cases, the assembly of the column 44 on the sleeve 43 may be accompanied by interposing a part or by depositing a sealant for the purpose of at least partially closing the interstices or gaps 45 that remain, mostly between the crank socket 41 and/or the column 44 on the one hand and the crown 14 of the fork and the base of the sloping member 15, on the other hand.

Figure 10:
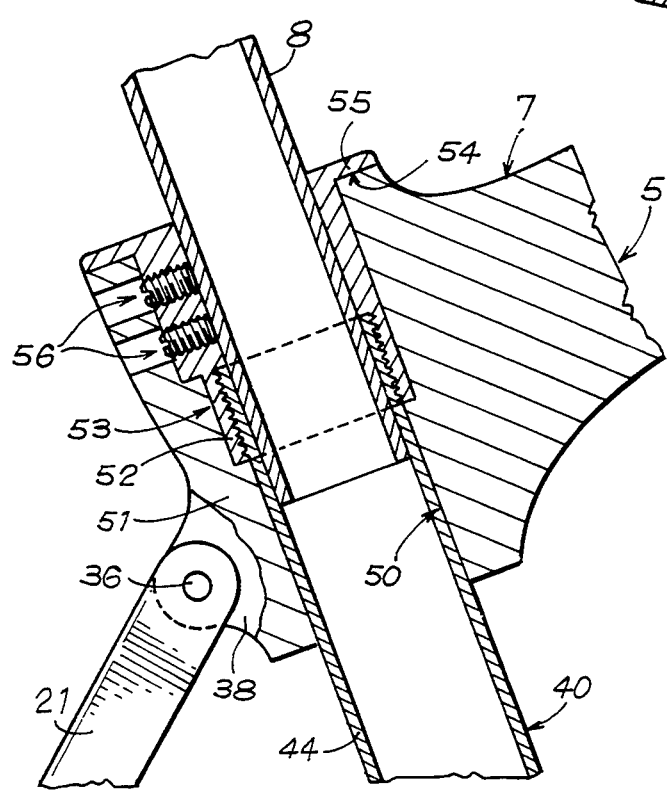
FIG. 10 is a fragmentary elevation-section view on a different scale showing another way of assembling the frame together.

As can be seen in FIG. 10, the column 44 is also engaged as a push-fit into a well 50 that is provided in the corresponding direction to pass through the rear assembly portion 7 of the top bar 5. The well 50 may, where appropriate, be lined with a bush that is inserted or insertable in the rear portion 7 which forms, in this respect, a mass 51 suitable for constituting a socket for receiving the saddle tube. The top end portion of the column 44 is also connected, in particular by screwing and by adhesive, with a tubular housing 52 that is fitted and bonded by adhesive inside a housing 53 formed in the socket 51 coaxially with the well 50 in such a manner to open out in a bearing surface 54 presented by the top surface of the socket 51. The housing 52 is provided with a top collar 55 for bearing against the plane 54 with or without an interposed sealing gasket.

The housing 52 is provided with sliding and locking means suitable for co-operating with the saddle tube 8. These means are given overall reference 56 and may be constituted by one or more screws or by other means for clamping the housing 52, which means are accessible from the rear face of the housing 51.

Using the above-described means, it becomes possible to manufacture the two main component elements of a cycle frame, namely the top bar 5 and the bottom bar 10, by molding them out of composite material.

Depending on the morphological characteristics of the cyclist, it is possible to adjust the height of the frame that is to be obtained by defining the length of the column 44 and the height of the tubular segment 23.

It is also possible to define the length of the frame by cutting the terminal portions 6 and 16 to length so that after they have been engaged in the sleeves 24 and 25, the distance D between the axis of the column 40 and the axis of the segment 23 corresponds to the projection dimension that is to be satisfied. Thereafter, by an appropriate choice of length for the stays 21, the assembly can provide a frame as shown in continuous lines in FIG. 1 or any frame intermediate between said frame and the frame shown in chain-dotted lines in FIG. 1 and referenced 5a.

Thus, FIG. 1 shows that by acting selectively on the length of the column 40, the length of the stays 21, the length of the segment 23, and the lengths of the terminal portions 6 and 16, it is possible to provide a positive response to any personalized structural requirements while subjecting the main elements that are molded out of composite material to no operations other than cutting to length and then fitting and gluing, all of which can be performed quickly, simply, and above all reliably.

The means of the invention make it possible to obtain such results while satisfying constant and unavoidable conditions of frame construction, i.e. the length of the rear fork as a function of wheel radius, the angle between the rear fork and the column 40 as defined by the construction of the spacer member, and the angle of the front fork which is defined by construction by the assembly lugs 24 and 25.

To obtain a fitted frame of the invention, it suffices, so to speak, firstly to have four parts that are identical under all circumstances, namely the crank socket 41, the lugs 24 and 25, and the housing 52, and secondly prefabricated frame elements such as 5, 10, 21, and 40 which are then cut to appropriate lengths so that on being assembled together the frame satisfies the desired conditions of height and length, while nevertheless making use of members that are made by molding composite material, i.e. that benefit from very light weight, great mechanical strength (particularly in twisting), and good resistance to corrosion.

It should be considered that it is possible to implement a crank socket 41 that does not have the threaded sleeve 43 and that said tube may be fitted during manufacture of the bottom bar member 10 rather than being subsequently inserted therein. Similarly, it may be envisaged that the socket 41 could be secured to the base of the spacer member 40 with said socket being designed to co-operate with a bushing constituting the journal bearing for the pedal crank axle.

Figure 11:
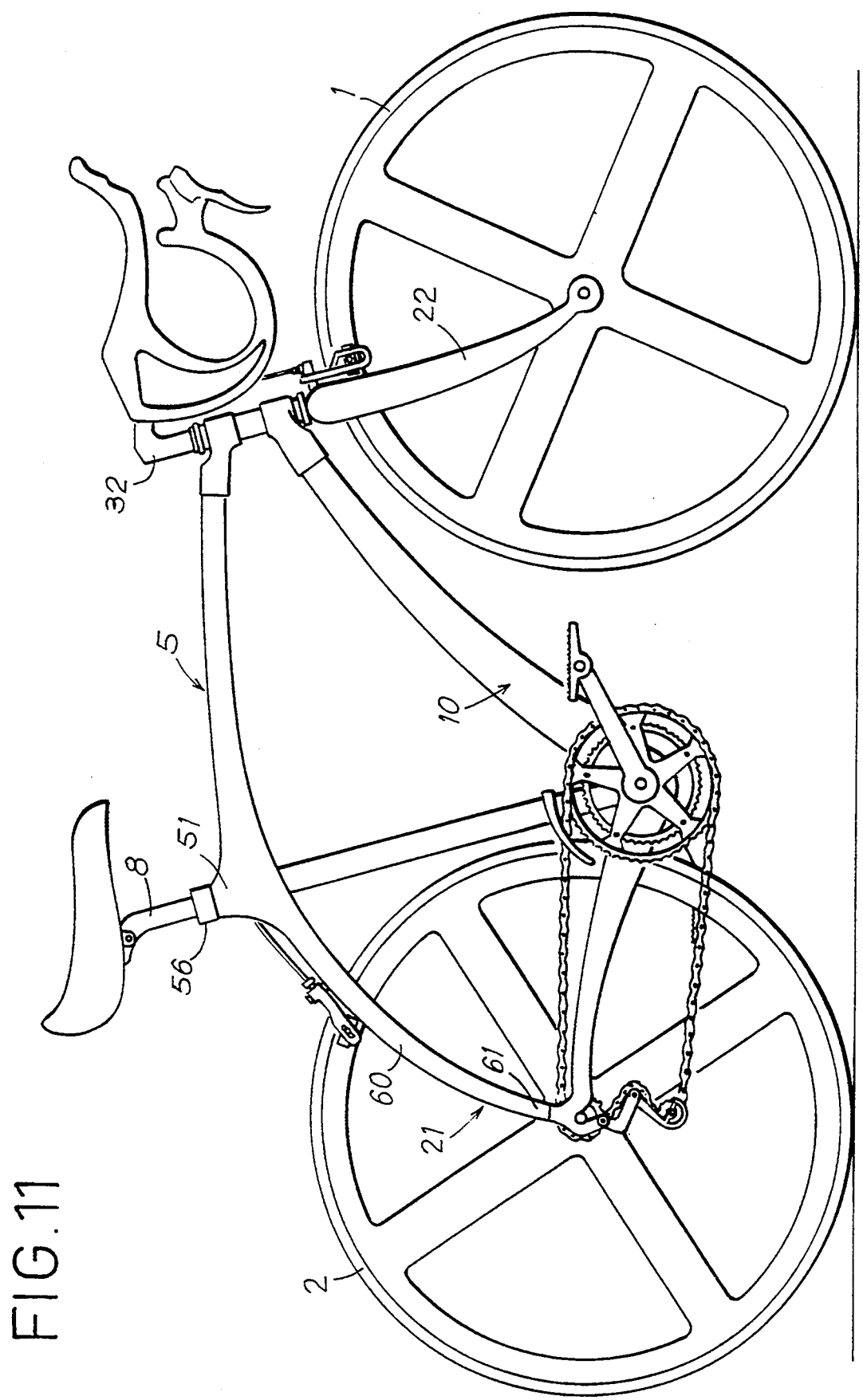
FIG. 11 is a diagrammatic side elevation showing a variant embodiment of the frame of the invention.

FIG. 11 shows another embodiment in which the stays 21 connecting the top bar 5 to the bottom bar 10 are formed by extensions 60 of the top bar 5 running from a fork join associated with the socket 51. Under such circumstances, the end portions 61 of the stays 60 are also suitable for being cut to length so as to match the length thereof to the length of the column 44, in particular. They may then be secured to the terminal portions 12 by engagement and by adhesive.

The invention is not limited to the embodiments described and shown since numerous modifications may be applied thereto without going beyond the ambit of the invention.

We claim:

1. A cycle frame having adjustable desired length and height comprising:
    a molded top member including a front terminal portion and a rear assembly portion, said rear assembly portion constituting a socket for receiving a saddle tube, said front terminal portion having an associated length that evinces a constant, polygonal-shaped cross-section;
    a unitary molded bottom member including a rear fork provided with rear terminal portions defining beating slots for receiving an axle of a rear wheel, a crown section spaced from said rear terminal portions, and a sloping member that extends up from said crown section, said sloping member including a front terminal portion, remote from said crown section, having an associated length that evinces a constant, polygonal-shaped cross-section;
    a first lug including a first sleeve portion, said first sleeve portion being adapted to receive the front terminal portion of said top member;
    a second lug including a second sleeve portion, said second sleeve portion being adapted to receive the front terminal portion of said sloping member;
    a tubular member having an associated length, said tubular member interconnecting said first and second lugs and constituting a steering swivel socket of said cycle frame;
    a pair of stays interconnecting the rear assembly portion of said top member and the rear terminal portions of said rear fork;
    a crank socket located at the crown section of said bottom member; and
    a spacer member extending between the rear assembly portion of said top member and the crown section of said bottom member, wherein the desired length of said cycle frame can be readily altered by cutting the front terminal portions of said top and bottom members and the desired height of said cycle frame can be readily altered by cutting said pair of stays, said tubular member and said spacer member.

2. A cycle frame according to claim 1, wherein the front terminal portion of said sloping member extends at a constant angle of inclination relative to, and at least a substantial portion of said sloping member, other than said front terminal portion, is offset from, a line passing through the bearing slots of the rear fork and said crank socket.

3. A cycle frame according to claim 1, wherein the stays are made of independent elements fitted to the top member and to the rear terminal portions of the rear fork.

4. A cycle frame according to claim 1, wherein the stays are integrally formed with said top member.

5. A cycle frame according to claim 1, wherein the top and bottom members and tubular member are made of composite material; and the first and second lugs, the spacer member, and the crank socket are made of metal.

6. A cycle frame according to claim 1, wherein the crank socket is positioned in the crown section of the rear fork, adjacent the sloping member, and is secured to a base portion of the spacer member.

7. A cycle frame according to claim 1, wherein the spacer member is constituted by a column inserted in a well passing through the rear assembly portion of the top member to which said spacer member is maintained by a tubular housing including means enabling a saddle tube to be slidably received therein and to be locked in place.

8. A cycle frame according to claim 7, wherein the tubular housing is centered in a bore coaxial with the well and possesses a top collar providing a sealed closure of the well and bearing against the rear assembly portion, said tubular housing serving to center and hold the spacer member.

9. A cycle frame according to claim 7, wherein the means enabling a saddle tube to be locked in place is constituted by adjustment members that bear against the spacer member inside the tubular housing, said adjustment members being accessible from a rear face of said rear assembly portion.

10. A method of forming a cycle frame having desired length and height dimensions comprising:
molding a top member with a front terminal portion having an associated length that evinces a constant, polygonal-shaped cross-section and a rear assembly portion constituting a socket for receiving a saddle tube;
molding a bottom member including a rear fork having rear terminal portions defining bearing slots for receiving an axle of a rear wheel, a crown section spaced from the rear terminal portions, and a sloping member that extends up from the crown section and ends in a front terminal portion having an associated length that evinces a constant, polygonal-shaped cross-section;
providing a first lug with a first sleeve portion adapted to receive the front terminal portion of said top member;
providing a second lug with a second sleeve portion adapted to receive the front terminal portion of said sloping member;
providing a tubular member for interconnecting the first and second lugs and defining a steering swivel socket for said cycle frame;
providing a pair of stays for interconnecting the rear assembly portion of said top member and the rear terminal portions of said rear fork;
providing a crank socket at the crown section of said bottom member;
providing a spacer member for interconnecting the rear assembly portion of said top member and the crown section of said bottom member;
establishing a desire length for said cycle frame by cutting the front terminal portions of said top and bottom members; and
establishing a desired height for said cycle frame by cutting said pair of stays said tubular member and said spacer members.

11. A method of forming a cycle frame according to claim 10, further comprising: arranging the front terminal portion of said sloping member to extend at a constant angle of inclination relative to a line passing through the bearing slots of the rear fork and the crank socket while at least a substantial portion of said sloping member, other than said front terminal portion, is arranged offset from this line.

12. A method of forming a cycle frame according to claim 10, further comprising:
molding the top and bottom members and the tubular member of composite material; and
forming the first and second lugs, the spacer member and the crank socket of metal.

13. A method of forming a cycle frame according to claim 10, further comprising: bonding said crank socket to a base portion of said spacer member.

14. A method of forming a cycle frame according to claim 10, further comprising:
push-fitting the spacer member into a well that passes through the rear assembly portion of said top member; and
providing a tubular housing in said well that can slidably receive a saddle tube.

* * * * *